United States Patent
Onggosanusi et al.

(10) Patent No.: US 8,209,575 B2
(45) Date of Patent: *Jun. 26, 2012

(54) MIMO HYBRID-ARQ USING BASIS HOPPING

(75) Inventors: Eko N. Onggosanusi, Allen, TX (US);
Yan Hui, San Diego, CA (US); Anand Ganesh Dabak, Plano, TX (US);
Gibong Jeong, Seoul (KR)

(73) Assignee: Texas Instruments Incorporated, Dallas, TX (US)

( * ) Notice: Subject to any disclaimer, the term of this patent is extended or adjusted under 35 U.S.C. 154(b) by 904 days.

This patent is subject to a terminal disclaimer.

(21) Appl. No.: 12/244,660

(22) Filed: Oct. 2, 2008

(65) Prior Publication Data

US 2009/0031184 A1  Jan. 29, 2009

Related U.S. Application Data

(63) Continuation of application No. 10/230,003, filed on Aug. 28, 2002, now Pat. No. 7,447,967.

(51) Int. Cl.
*H08C 25/02* (2006.01)
*H04L 1/08* (2006.01)

(52) U.S. Cl. ........................................ 714/748

(58) Field of Classification Search .................. 714/746, 714/752, 748, 749, 776
See application file for complete search history.

(56) References Cited

U.S. PATENT DOCUMENTS

| | | | |
|---|---|---|---|
| 5,483,545 A | 1/1996 | Darmon et al. | |
| 5,487,068 A | 1/1996 | Smolinske et al. | |
| 5,657,325 A | 8/1997 | Lou et al. | |
| 5,689,439 A | 11/1997 | Weerackody et al. | |
| 5,870,406 A | 2/1999 | Ramesh et al. | |
| 5,959,672 A | 9/1999 | Sasaki | |
| 6,157,612 A | 12/2000 | Weerackody et al. | |
| 6,308,294 B1 | 10/2001 | Ghosh et al. | |
| 6,512,758 B1 | 1/2003 | Sato et al. | |
| 6,654,922 B1 | 11/2003 | Numminen et al. | |
| 6,700,867 B2 | 3/2004 | Classon et al. | |
| 6,735,180 B1 | 5/2004 | Malkamaki et al. | |
| 6,970,438 B2 | 11/2005 | Mate et al. | |
| 7,298,717 B2 * | 11/2007 | Hui et al. | 370/329 |
| 7,447,967 B2 * | 11/2008 | Onggosanusi et al. | 714/748 |
| 7,698,616 B2 * | 4/2010 | Onggosanusi et al. | 714/748 |
| 2001/0049291 A1 | 12/2001 | Sato et al. | |
| 2002/0012318 A1 | 1/2002 | Moriya et al. | |
| 2003/0039220 A1 | 2/2003 | Kwak | |
| 2003/0095498 A1 | 5/2003 | Sato et al. | |

FOREIGN PATENT DOCUMENTS

EP   0 572 171 A1   5/1993

* cited by examiner

*Primary Examiner* — Phung M Chung
(74) *Attorney, Agent, or Firm* — Ronald O. Neerings; Wade James Brady, III; Frederick J. Telecky, Jr.

(57) ABSTRACT

A Hybrid Automatic Retransmission Request (H-ARQ) technique is provided for Multi-Input Multi-Output (MIMO) systems. The technique changes the basis (V) upon retransmission, which helps reduce the error probability upon retransmission. This basis hopping technique provides for improved performance gain without significant increase in design complexity. In one embodiment, communication device (100) includes a receiver section (114) for receiving an acknowledgment (ACK) or a non-acknowledgment (NACK) signal in response to information transmitted by the transmitter section of the communication device. If a NACK is received, a new basis is selected from a set of basis stored in a basis set unit (110). The new basis that is selected is then used by a linear transformation unit (106) in the retransmission of the information.

27 Claims, 4 Drawing Sheets

MIMO HYBRID-ARQ USING BASIS HOPPING

This application is a Continuation of application Ser. No. 10/230,003 filed Aug. 28, 2002, now U.S. Pat. No. 7,447,967.

TECHNICAL FIELD

This invention relates in general to communication systems, and more particularly to a Multi-Input Multi-Output (MIMO) Hybrid-ARQ (Hybrid Automatic Repeat Request) using basis hopping.

BACKGROUND

In packet communication systems, packet retransmission is often requested when a received packet is detected to be in error. This scheme, termed automatic retransmission request (ARQ), is intended to reduce packet errors. However, retransmitting the same information several times tends to reduce the communication system throughput. To reduce the number of required retransmissions, more efficient ARQ techniques are typically used.

Hybrid ARQ (H-ARQ) techniques, which include Chase combining and incremental redundancy, have been shown to improve efficiency by reducing ARQ overhead. H-ARQ techniques are primarily designed assuming a single-antenna transmitter and receiver. In standard proposals submitted to HSDPA and 1xEVDV, symbol/bit combining (i.e., Chase combining) or incremental redundancy has been used in the H-ARQ technique. Transmit Diversity (TD) has been used in the IS-2000 and Wideband Code Division Multiple Access (WCDMA) standards and in their current evolution proposals. In the IS-2000 standard, for example, two open loop TD schemes have been adopted, i.e., Orthogonal Transmit Diversity (OTD) and Space-Time Spreading (STS). In WCDMA, both open and closed loop TD schemes have been adopted.

The use of multiple antennas to increase system throughput/data rate has started to gain attention in some communication systems, such as in third generation wireless systems like the 3GPP (3$^{rd}$ Generation Partnership Project) and 3GPP2 standards bodies. Different multi-antenna techniques have been proposed for those standards, such as the use of transmit diversity and multi-input multi-output (MIMO) antenna processing techniques. Although the above-mentioned techniques serve their intended purpose, a need exists in the art for HARQ techniques that fully exploit the characteristics of MIMO channels by providing for improved data throughput and system capacity.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
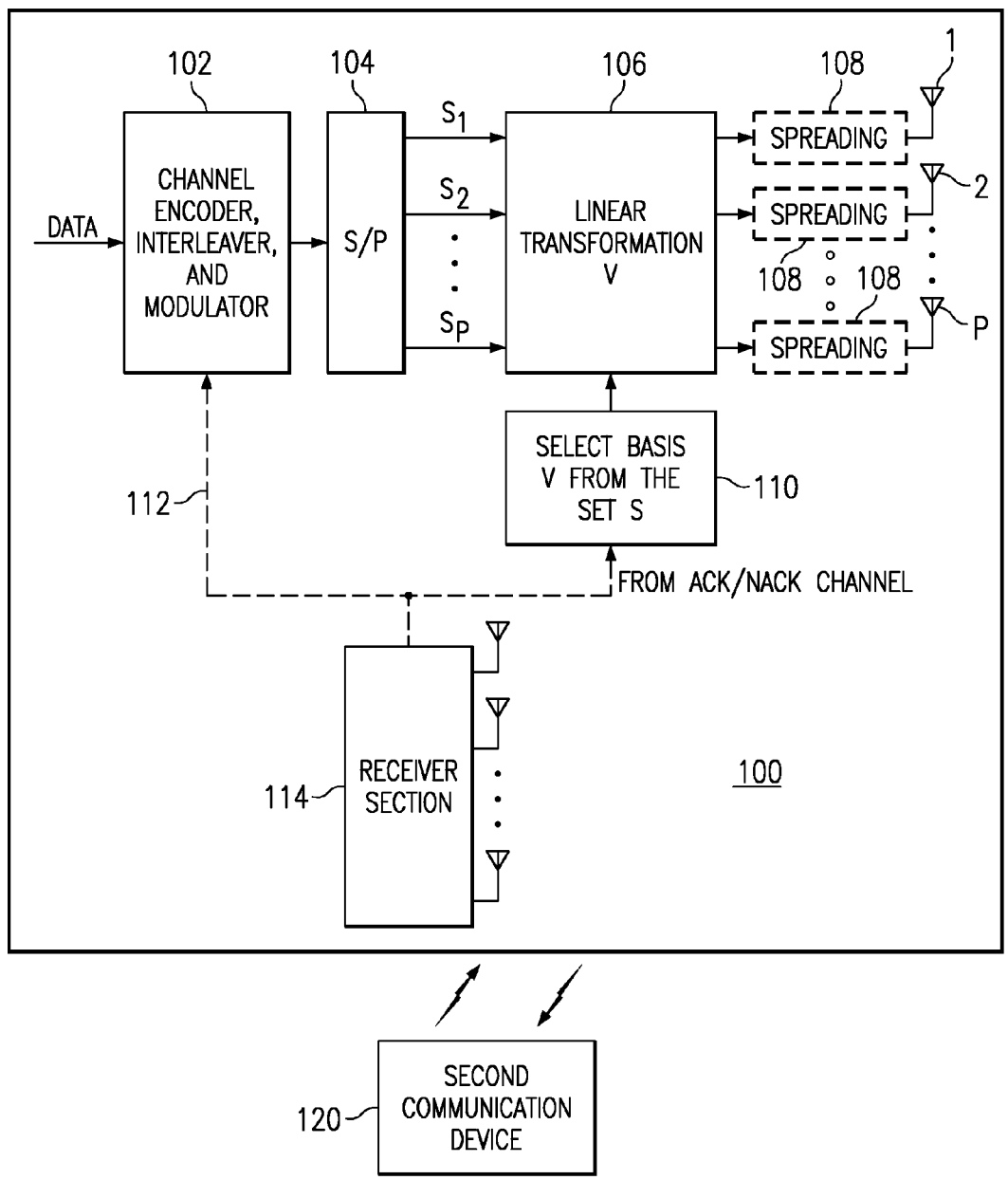
FIG. 1 shows a communication system that can support the MIMO H-ARQ technique of the present invention.

While the specification concludes with claims defining the features of the invention that are regarded as novel, it is believed that the invention will be better understood from a consideration of the following description in conjunction with the drawing figures, in which like reference numerals are carried forward.

The present invention provides for a MIMO Hybrid-ARQ (H-ARQ) technique based on a basis hopping concept. A communication device 100 includes a transmitter section that can support the MIMO H-ARQ technique is shown in FIG. 1. Communication device 100 includes a transmitter section including a channel encoder, interleaver and modulator block 102, a serial-to-parallel converter 104, a linear transformation block 106 which uses a basis V selected from set S in block 110, spreading blocks 108 (note that the spreading operation only applies to CDMA-based systems. The technique described in this application applies to any other systems such as TDMA, FDMA, OFDM, etc) and a ACK/NACK channel input 112. Communication unit 100 communicates with a second communication unit 120.

Assuming that the number of transmit and receive antennas are P and Q, respectively, and that the data in a particular frame, m, is encoded, interleaved, modulated, and split into P sub-streams. A P X P linear transformation is applied by linear transformation block 106 before spreading by spreader 108 (only needed for CDMA-based systems) and transmission via the appropriate antenna (1 to P). A set of pre-determined basis or linear transformations is then chosen. Let the basis set be S={$V_0, V_1, \ldots, V_{N-1}$} and is stored in block 110. Upon the first transmission, the first basis $V=V_0$ in the set S is chosen. Note that a typical MIMO architecture does not utilize V (that is, $V_n = I_P$).

The receiver is equipped with Q receive antennas. After despreading, all the P sub-streams are separated using an interference-resistant detector such as a linear or iterative Zero Forcing or Minimum Mean Squared Error (ZF/MMSE) detector, or maximum likelihood (ML) detector. When a linear or iterative detector is used, $Q \geq P$ antennas are required so that the receiver has ample degrees of freedom the separate P different signal sources. The same requirement holds in general when no forward error correcting code is employed. When forward error correcting code is employed and a Maximum-Likelihood (ML) detector is used, however, this requirement can be relaxed. In this case, Q can be less than P. The sub-streams are then demodulated, merged into a single stream, and decoded to construct frame m. A Cyclic Redundancy Check (CRC) is then performed to determine whether frame m is in error. If frame m is declared error-free, an acknowledgment (ACK) is sent to the transmitting unit and the transmitting unit will not retransmit frame m. Otherwise, a no-acknowledgment (NACK) is sent to transmitting unit 100 via channel 112 in order to request a retransmission.

The MIMO H-ARQ technique in accordance with the preferred embodiment works as follows. When the n-th NACK (retransmission request $n \geq 1$, the n-th retransmission is also referred as the (n+1)-th transmission) is received in channel 112, a new basis $V=V_n$ is chosen for the linear transformation from set S in block 110. For a given basis set size N, when $n>N-1$, we choose $V=V_{n\,mod\,N}$. The idea behind changing the basis upon retransmission is the fact that the error rate performance of the MIMO scheme is affected by the choice of basis $V_n$. When a packet is declared in error, choosing a different basis will likely reduce the error probability upon retransmission. Notice that the "channel encoder, interleaver, and modulator" block 102 may change upon retransmission request to accommodate the use of some single-antenna H-ARQ schemes such as incremental redundancy (IR), constellation rotation, interleaver hopping, as well as simple Chase combining.

There are many possibilities for the basis hopping pattern used for the retransmissions as well as for the basis set. The basis hopping pattern can be pseudo-randomized or selected based on a pre-determined pattern. For a given set size N, a good basis set should cover a wide range of "weighting". A possible choice of basis set for $P=Q=2$ scenario can be generated from the parameterization of 2×2 unitary matrices:

$$V_{n,m} = \begin{bmatrix} e^{j\phi m}\cos\theta_n & -e^{j\phi m}\sin\theta_n \\ \sin\theta_n & \cos\theta_n \end{bmatrix}$$

$$\theta_n = \frac{\pi n}{2(N-1)}, n = 0, 1, \ldots, N-1$$

$$\phi_m = \frac{2\pi m}{M}, m = 0, 1, \ldots, M-1.$$

Equation 1

While the choice of basis set can be arbitrary, choosing the basis set to contain unitary matrices is intended to avoid any increase in transmit power. In the above example, the set size is NM. The above generator can be extended for $P>2$ by using a parameterization of unitary matrices such as by performing a Givens rotation.

The basis set can also be generated based on the characteristics of the spatial channel such as long-term spatial correlation profile. In this sense, the basis set is chosen to be adaptive to the channel characteristics.

In general, the basis set $S=\{V_0, V_1, \ldots, V_{N-1}\}$ can be constructed using the following guidelines:
1. The correlation between any of the two matrices $V_n$ and $V_m$ should be minimized. Hence, S should cover a wide range of unitary matrices. The set size N should not be too large, as the correlation between any of the two matrices tends to increase with N.
2. For a given channel fading rate, N should be sufficiently large such that the time elapsed between transmission 1 and N+1 is comparable to the channel coherence time.
3. Assume that at the n-th retransmission, $V=V_n$ is chosen. Since the probability of packet error after 3 transmissions is smaller than that after 2 transmissions (or the probability of packet error after n+1 transmissions is smaller that that after ntransmissions), the correlation between $V_1$ and $V_0$ should be less than the correlation between $V_2$ and $V_0$. This is intended to maximize the throughput gain due to HARQ process. Similarly, the correlation between $V_2$ and $V_0$ should be less than the correlation between $V_3$ and $V_0$.

Figure 6:
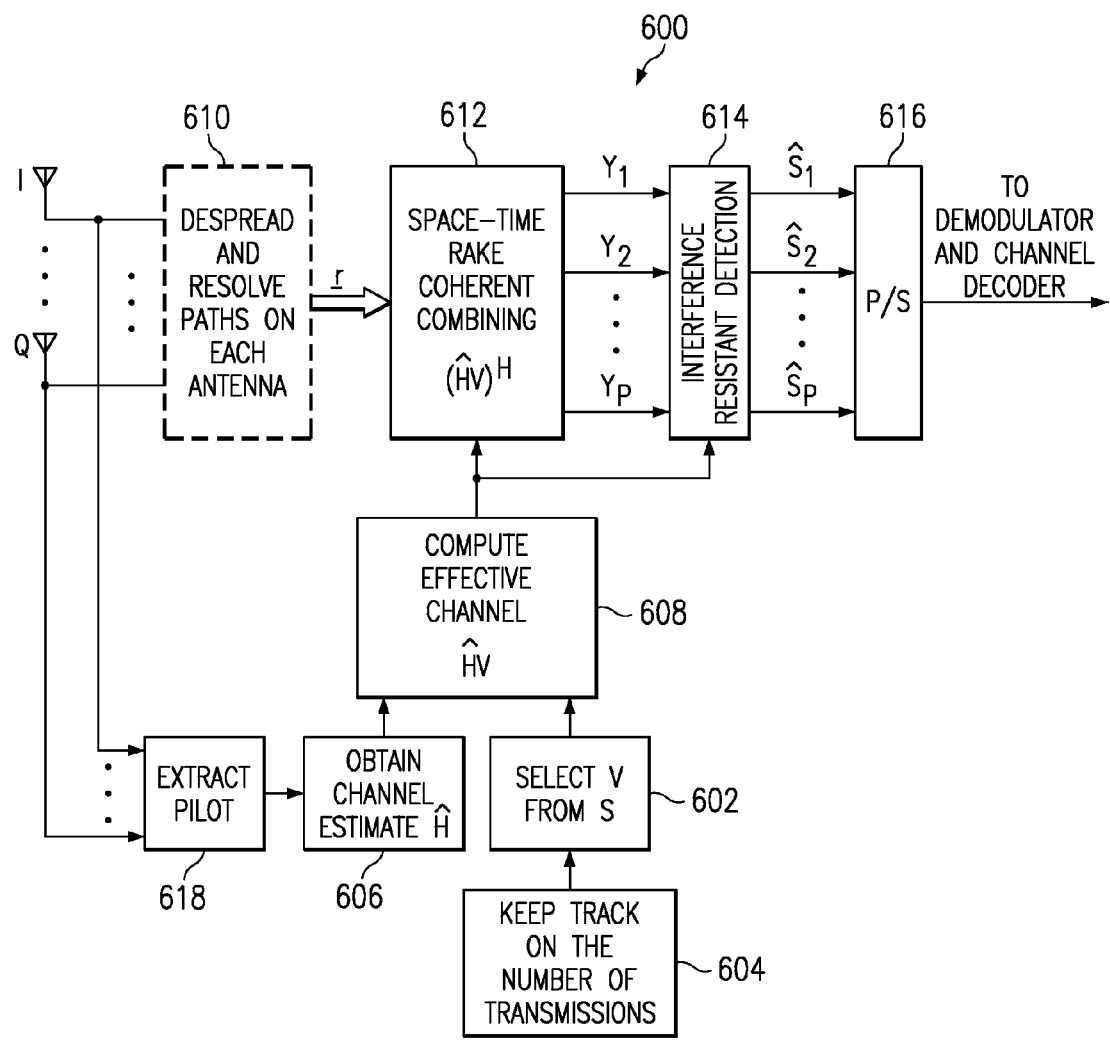
FIG. 6 shows a block diagram of a receiver in accordance with the present invention.

In FIG. 6, there is shown a block diagram of a receiver 600 in accordance with the invention. Note that receiver 600 can be used for the receiver section 114 shown in FIG. 1. The linear transformation V changes the effective MIMO channel experienced by the transmitted signal. Letting the Q X P physical MIMO channel matrix be H, then, the effective MIMO channel after the linear transformation is HV. Denoting the Q-dimensional vector of the baseband-received signal (after despreading by block 610) as r and the P-dimensional vector of transmitted symbols as s, r can be written as $$r = HVs + w$$

where w is the Additive White Gaussian Noise (AWGN) vector. This needs to be taken into account at the receiver 600. It can be verified that the additional complexity associated with the linear transformation operation is not significant. It is also backward compatible to the regular MIMO system (we can simply choose $V=I_p$). Note that the MIMO H-ARQ technique of the present invention can be used in conjunction with single-antenna H-ARQ schemes such as Chase combining or incremental redundancy.

Both the transmitter and receiver (also referred to as communication units or just units) have the knowledge of the basis set S and keep track on the number of transmissions for a particular data packet. The basis set S can be predetermined and made available at the transmitting and receiving units. If the basis set is made adaptive to the channel characteristic, some kind of communication between the transmitting and receiving units should be established to make the basis set available at both units. For Frequency Division Duplex (FDD) systems, the basis set can be chosen at the receiver and then communicated to the transmitter via a feedback channel. For Time Division Duplex (TDD) systems, since the channel characteristic can be made available at the transmitting unit, the basis set can be chosen at the transmitting unit and then communicated to the receiving unit, or vice versa.

For the choice of the hopping pattern, there are several possibilities:
1. The pattern can be predetermined. In this case, the choice of basis at a particular time instant does not have to be communicated from the transmitter to the receiver, or vice versa.
2. The pattern can be pseudo-random. In this case, some kind of communication/signaling between the transmitter and receiver should be established to communicate the choice of basis.

For a given basis set S, different hopping patterns should not result in significant performance difference. Hence, a predetermined pattern may be preferred to avoid the need for additional signaling.

After space-time RAKE coherent combining with the effective MIMO channel in combiner block 612, interference resistant detection is performed by detector 614 to obtain the soft decision statistics for $\{s_1, s_2, \ldots, s_P\}$ (for systems without forward error correcting code, hard decision can be directly obtained). As previously mentioned, some examples of detectors 614 that can be used include linear zero-forcing (LZF), linear minimum mean square error (LMMSE), iterative zero-forcing (IZF), iterative MMSE (IMMSE), and maximum likelihood (ML) detectors.

Denoting the P-dimensional vector of the received signal after Space-Time (ST) RAKE combining as y, a LZF detector as a first example generates the soft decision statistics as follows:

$$\hat{s} = (V^H H^H HV)^{-1} y = (V^H H^H HV)^{-1} V^H H^H r.$$

A LMMSE detector as a second example generates the soft decision statistics as follows:

$$\hat{s}=(V^H H^H H V+\sigma^2\Lambda^{-1})^{-1}y=(V^H H^H H V+\sigma^2\Lambda^{-1})^{-1}V^H H^H r$$

where $\sigma^2$ is the noise variance and $\Lambda=\text{diag}\{E|s_1|^2, E|s_2|^2, \ldots, E|s_p|^2\}$.

In receiver 600, the soft decisions are then sent to a parallel-to-serial (P/S) converter 616 for conversion into a serial data stream which is forwarded to a conventional demodulator and decoder as is known in the art.

Receiver 600 also includes a block 618 for extracting the pilot signal from the received signal. The pilot signal is used by block 606 to obtain an estimate of the channel. A retransmission determination block 604 keeps track of the number of transmissions, and if a retransmission is detected, it informs the basis set selection unit 602 to select a new basis. The basis selection unit 602 can be a memory storage area where the plurality of basis can be stored. The channel estimate and the new basis are sent to block 608 in order to compute the effective channel information that is sent to combiner 612 and detector 614.

It should be noted that the previous discussion, describing how to compute the effective channel (HV) using receiver 600 is relevant when a common pilot channel is used (in this case H is obtained from the common pilot channel using block 606). In an alternative embodiment, where a dedicated pilot channel is utilized, the pilot signals can be rotated with V and transmitted. In this case, the rotation determination by the receiver can be automatically taken care of after extraction of the pilot by the channel estimation, since the receiver gets V from the transmitter.

In order to demonstrate the potential of the basis hopping technique of the present invention, the performance of a (2,2) MIMO using Chase combining and basis hopping is simulated. The basis set is chosen according to equation 1 with N=4, M=1. Raw Bit Error Rate (BER) simulation results for up to 3 retransmissions (4 transmissions total) are used to compare the performance of the system with and without the use of basis hopping (BH). The basis hopping pattern in this illustrative example is fixed to $\{1, 2, 3, 4\}$.

Figure 2:
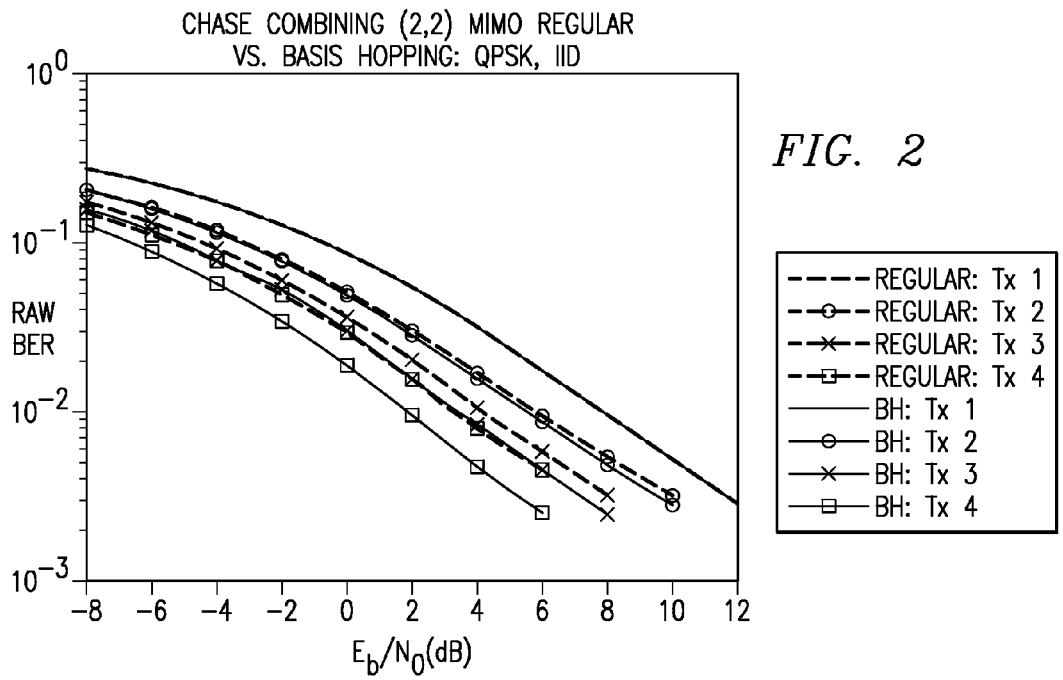
FIG. 2 shows a graph highlighting a simulation of the performance using a (2,2) MIMO Chase combining with basis hopping using QPSK and assuming an IID channel in accordance with the invention.
Figure 3:
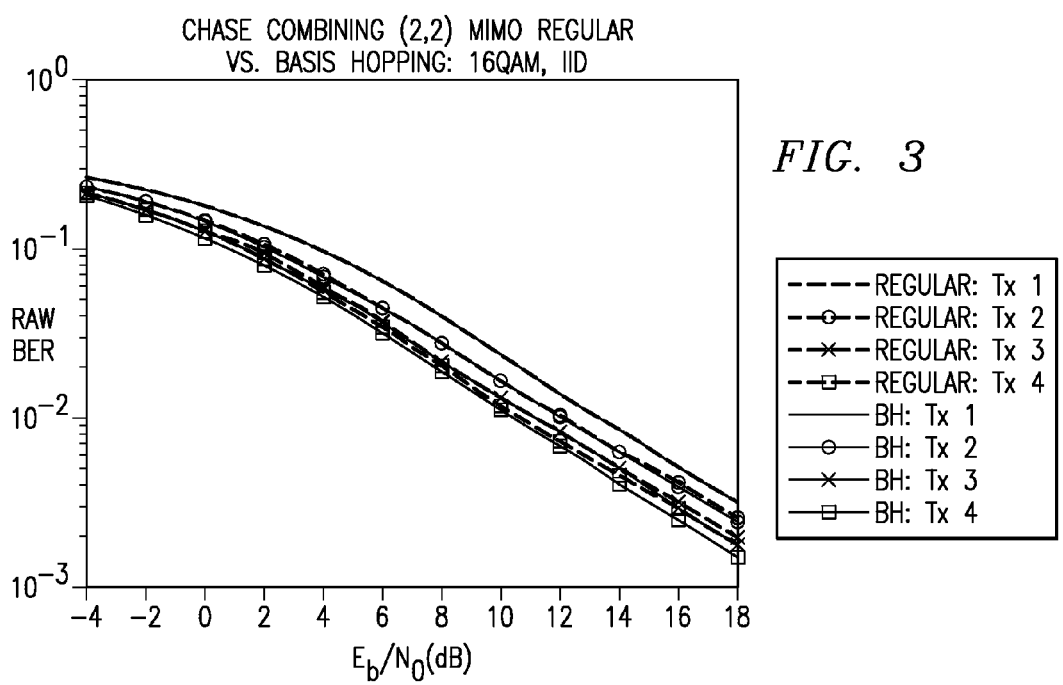
FIG. 3 shows a graph highlighting a simulation of the performance using a (2,2) MIMO Chase combining with basis hopping using 16 QAM and assuming an IID channel in accordance with the invention.
Figure 4:
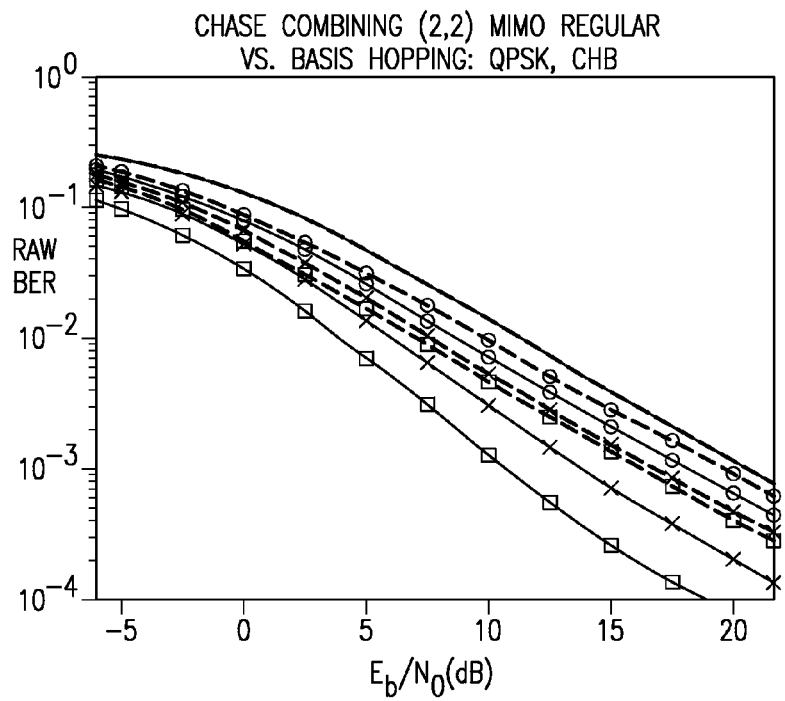
FIG. 4 shows a graph highlighting a simulation of the performance using a (2,2) MIMO Chase combining with basis hopping using QPSK and assuming channel B (highly correlated channel) in accordance with the invention.
Figure 5:
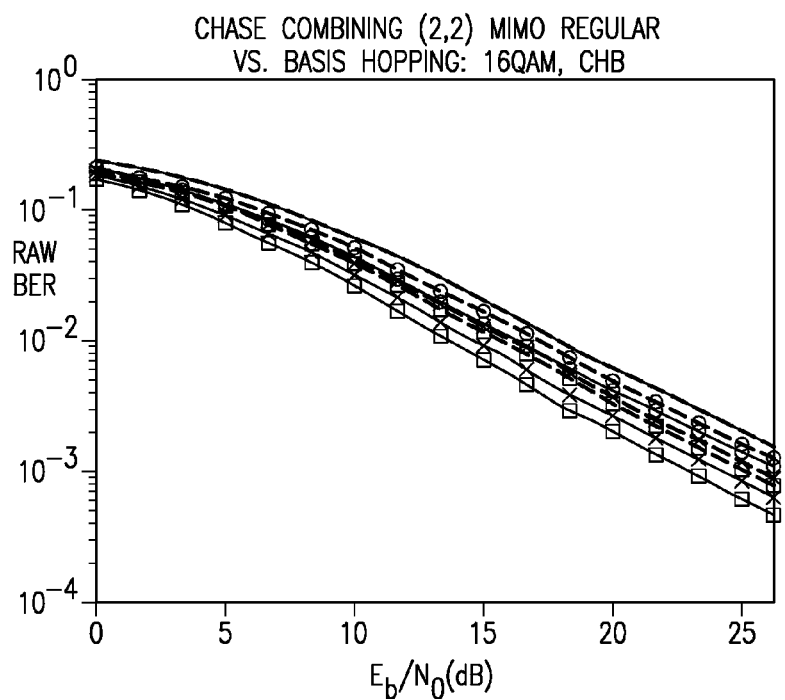
FIG. 5 shows a graph highlighting a simulation of the performance using a (2,2) MIMO Chase combining with basis hopping using 16 QAM and assuming a channel B (highly correlated channel) in accordance with the invention.

FIGS. 2 and 3 show the results for Quadrature Phase Shift Keying (QPSK) and 16 QAM modulation assuming an IID channel. The results assuming channel B (a highly correlated channel with peak cross-correlation of 0.64 and average cross-correlation of 0.26) are given in FIGS. 4 and 5. Notice the significant performance gain of the BH MIMO Chase combining compared to a regular Chase combining scheme. The performance gain becomes more significant for lower order modulation and a more correlated channel. The gain of the BH scheme of the present invention compared to the regular Chase combining for QPSK in channel B is approximately 6-decibel (dB) at a BER=$10^{-3}$ at the $4^{th}$ transmission.

The above-described technique provides for a novel H-ARQ scheme for MIMO systems utilizing basis hopping. The use of the BH scheme of the present invention provides for improved performance gains without significant increases in complexity or changes to current MIMO systems. The technique can be a complement to single-antenna H-ARQ schemes, such as, but not limited to, Chase combining and incremental redundancy. In the preferred embodiment, when an ACK is received at the transmitting unit from the receiving unit, the weighting factor used for the previous transmission remains the same for the next transmission. However, if a NACK is received, a new basis or weighting factor (V) is chosen from the set S is used on both the transmitter and receiver.

The present invention has been described above with reference to a preferred embodiment. However, those skilled in the art having read this disclosure will recognize that changes and modifications may be made to the preferred embodiment without departing from the scope of the present invention. These and other changes or modifications are intended to be included within the scope of the present invention.

The invention claimed is:

1. A method for providing hybrid ARQ (H-ARQ) in a transmitting unit comprising the steps of:
    (a) receiving P different data streams, where P is an integer greater than one;
    (b) performing a transformation derived from a basis (V) on the P different data streams;
    (c) transmitting the transformed data streams over at least P respective transmit antennas to a receiving unit;
    (d) receiving a retransmission request (NACK) from the receiving unit;
    (e) changing the basis (V) in response to the NACK; and
    (f) transmitting a pilot signal over a pilot channel to the receiving unit that is transformed based on the changed basis (V), thereby allowing the receiving unit to determine the basis (V) after it extracts the pilot signal.

2. A method as defined in claim 1, wherein the transmitting unit does not change the basis (V) if an ACK is received from the receiving unit.

3. A method as defined in claim 1, wherein the new basis (V) selected in step (d) is selected from a set (S) having a plurality of bases ($V_0$-$V_{N-1}$).

4. A method as defined in claim 3, wherein the basis (V) is selected in step (d) from the set (S) in a pseudo-randomized fashion.

5. A method as defined in claim 3, wherein the basis (V) is selected in step (d) from the set (S) in a predetermined fashion.

6. A method as defined in claim 3, wherein the set (S) comprises a plurality of unitary matrices.

7. A method as defined in claim 6, wherein the set (S) is formed using a parameterization of unitary matrices.

8. A method as defined in claim 7, wherein a Givens rotation is used in forming the set (S).

9. A method as defined in claim 1, wherein the transmitting and receiving units both have multiple antennas.

10. A method as defined in claim 1, wherein the set (S) is formed based on the spatial channel characteristics experienced by the transmitting unit.

11. A method for providing hybrid ARQ (H-ARQ) in a transmitting unit operating in a Frequency Division Duplex (FDD) communication system, comprising the steps of:
    receiving P different data streams, where P is an integer greater than one;
    performing a transformation derived from a basis (V) on the P different data streams;
    transmitting the transformed data streams over at least P respective transmit antennas to a receiving unit;
    receiving a retransmission request (NACK) from the receiving unit; and
    changing the basis (V) in response to the NACK.

12. A method for providing hybrid ARQ (H-ARQ) in a transmitting unit operating in a Time Division Duplex (TDD) communication system, comprising the steps of:
    receiving P dependent data streams, where P is an integer greater than one;
    performing a transformation derived from a basis (V) on the P different data streams;
    transmitting the transformed data streams over at least P respective transmit antennas to a receiving unit;

receiving a retransmission request (NACK) from the receiving unit;

changing the basis (V) in response to the NACK.

13. A hybrid-ARQ method for a multiple-input multiple-output (MIMO) communication apparatus, the method comprising the steps of:
   (a) transmitting a packet of P different data streams from at least P respective transmit antennas by incremental redundancy to a remote receiver, where P is an integer greater than one;
   (b) determining if a retransmission of the packet is required; and
   (c) transforming the packet for the next transmission if it is determined that a retransmission of the packet is required.

14. A hybrid-ARQ method as defined in claim 13, wherein if in step (b) it is determined that a retransmission of the packet is required, the transforming step comprises changing a weighting factor.

15. A hybrid-ARQ method comprising the steps of:
   (a) receiving a signal comprising P different data streams from at least P respective transmit antennas of a remote communication apparatus;
   (b) determining if a retransmission of the signal is required; and
   (c) transforming the signal if it is determined that the retransmission of the signal is required, wherein the transformation is derived from a basis (V).

16. A method as defined in claim 15, wherein the basis (V) does not change if a retransmission of the signal is not required.

17. A method as defined in claim 15, wherein a new basis (V) is selected from a basis set (S) having a plurality of bases ($V_0$-$V_{N-1}$) if the retransmission of the signal is required.

18. A method as defined in claim 17, wherein the new basis (V) is selected from the basis set (S) in a pseudo-randomized fashion.

19. A method as defined in claim 17, wherein the new basis (V) is selected from the basis set (S) in a predetermined fashion.

20. A method as defined in claim 17, wherein the basis set (S) comprises a plurality of unitary matrices.

21. A method as defined in claim 20, wherein the basis set (S) is formed using a parameterization of unitary matrices.

22. A method as defined in claim 21, wherein a Givens rotation is used in forming the basis set (S).

23. A method as defined in claim 17, wherein the basis set (S) is formed based on the spatial channel characteristics experienced by the remote communication apparatus.

24. A method as defined in claim 15, wherein a unit receiving the signal and the remote communication apparatus both have multiple antennas.

25. A method as defined in claim 15, wherein the remote communication apparatus operates in a Frequency Division Duplex (FDD) mode.

26. A method as defined in claim 15, wherein the remote communication apparatus operates in a Time Division Duplex (TDD) mode.

27. A method as defined in claim 15, wherein the remote communication apparatus uses a dedicated pilot channel and transmits a pilot signal using the pilot channel that is transformed using the basis (V), thereby allowing a receiving unit to determine the basis (V) after it extracts the pilot signal.

* * * * *